(12) United States Patent
Kim et al.

(10) Patent No.: US 10,777,357 B2
(45) Date of Patent: Sep. 15, 2020

(54) MULTILAYER CAPACITOR

(71) Applicant: SAMSUNG ELECTRO-MECHANICS CO., LTD., Suwon-si, Gyeonggi-do (KR)

(72) Inventors: Je Jung Kim, Suwon-si (KR); Do Young Jeong, Suwon-si (KR); Do Yeon Kim, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/281,423

(22) Filed: Feb. 21, 2019

(65) Prior Publication Data

US 2020/0043666 A1  Feb. 6, 2020

(30) Foreign Application Priority Data

Aug. 1, 2018  (KR) .......................... 10-2018-0089674

(51) Int. Cl.
*H01G 4/30*  (2006.01)
*H01G 4/248*  (2006.01)
(Continued)

(52) U.S. Cl.
CPC ............... *H01G 4/30* (2013.01); *H01G 4/012* (2013.01); *H01G 4/2325* (2013.01);
(Continued)

(58) Field of Classification Search
CPC .......... H01G 4/005; H01G 4/012; H01G 4/30; H01G 4/12; H01G 4/224; H01G 4/228;
(Continued)

(56) References Cited

U.S. PATENT DOCUMENTS 7,324,324 B2 * 1/2008 Sugimoto ............... B32B 18/00
                                                                361/303
8,599,532 B2 * 12/2013 Sakuratani ............... H01G 4/30
                                                                361/301.4
(Continued)

FOREIGN PATENT DOCUMENTS

KR  10-2005-0038438 A  4/2005
KR  10-2010-0077030 A  7/2010
(Continued)

OTHER PUBLICATIONS

Korean Office Action dated Jul. 19, 2019 issued in Korean Patent Application No. 10-2018-0089674 (with English translation).

*Primary Examiner* — Michael P McFadden
(74) *Attorney, Agent, or Firm* — Morgan, Lewis & Bockius LLP

(57) ABSTRACT

A multilayer capacitor includes a capacitor body including an active region, and upper and lower cover regions; and first and second external electrodes. The active region includes first and second internal electrodes exposed through the third and fourth surfaces of the capacitor body; and first and second auxiliary electrodes spaced apart from the first and second internal electrodes and exposed through the fourth and third surfaces of the capacitor body, respectively. The upper and lower cover regions each include at least one dummy electrode. A first margin portion between the first internal electrode and the first auxiliary electrode and a second margin portion between the second internal electrode and the second auxiliary electrode are located in a position deviating from ends of the first and second band portions in a first direction from the third surface to the fourth surface of the capacitor body.

13 Claims, 6 Drawing Sheets

(51) Int. Cl.
*H01G 4/232* (2006.01)
*H01G 4/012* (2006.01)
*H01G 4/008* (2006.01)
*H01G 4/12* (2006.01)

(52) U.S. Cl.
CPC .............. *H01G 4/248* (2013.01); *H01G 4/008* (2013.01); *H01G 4/1227* (2013.01)

(58) Field of Classification Search
CPC ........ H01G 2/065; H01G 2/24; H01G 4/0085; H01G 4/20; H01G 4/2325; H01G 4/306; H01G 4/33; H05K 1/181; H05K 1/185
See application file for complete search history.

(56) References Cited

U.S. PATENT DOCUMENTS

| | | | |
|---|---|---|---|
| 2010/0220426 A1 | 9/2010 | Shimizu | |
| 2010/0271752 A1* | 10/2010 | Ishida | H01G 4/012 361/303 |
| 2013/0241361 A1* | 9/2013 | Lee | H01G 4/30 310/366 |
| 2014/0160625 A1* | 6/2014 | Jang | H01G 4/232 361/301.4 |
| 2014/0240895 A1* | 8/2014 | Lee | H01G 4/12 361/301.4 |
| 2015/0041197 A1* | 2/2015 | Lee | H01G 4/005 174/260 |
| 2015/0116891 A1* | 4/2015 | Park | H01G 4/40 361/270 |
| 2016/0099105 A1 | 4/2016 | Lee et al. | |
| 2016/0233024 A1* | 8/2016 | Kim | H01G 4/012 |
| 2018/0182551 A1 | 6/2018 | Ahn et al. | |
| 2019/0279819 A1* | 9/2019 | Horn | H01G 4/228 |

FOREIGN PATENT DOCUMENTS

| | | |
|---|---|---|
| KR | 10-2014-0106021 A | 9/2014 |
| KR | 10-2016-0040845 A | 4/2016 |
| KR | 10-2018-0073083 A | 7/2018 |

* cited by examiner

MULTILAYER CAPACITOR

CROSS-REFERENCE TO RELATED APPLICATION

This application claims the benefit of priority to Korean Patent Application No. 10-2018-0089674 filed on Aug. 1, 2018 in the Korean Intellectual Property Office, the entire disclosure of which is incorporated herein by reference for all purposes.

TECHNICAL FIELD

The following description relates to a multilayer capacitor.

BACKGROUND

Multilayer capacitors have positive characteristics in terms of miniaturization and implementing high capacity, while having ease of mounting. Thus, multilayer capacitors may be mounted on the circuit boards of various types of electronic products, including display devices such as a liquid crystal display (LCD), a plasma display panel (PDP) or the like, computers, smartphones and mobile phones, serving to charge or discharge electricity.

As the miniaturization, slimming, and multifunctionalization of electronic products have increased, the miniaturization of multilayer capacitors is required, and such multilayer capacitors are mounted in a highly integrated manner.

In addition, as industry interest in electric components has increased, multilayer capacitors having high reliability and high strength properties for use in automotive or infotainment systems have been demanded.

In recent years, since high flexural strength characteristics are required for chip components, a new method of improving flexural strength characteristics of a multilayer capacitor is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer capacitor having improved bending strength characteristics.

According to an aspect of the present disclosure, a multilayer capacitor includes a capacitor body having a first surface and a second surface opposing each other and a third surface and a fourth surface connected to the first and second surfaces and opposing each other, the capacitor body including an active region, and upper and lower cover regions disposed on upper and lower portions of the active region, respectively; and first and second external electrodes including first and second connection portions disposed on the third and fourth surfaces of the capacitor body, respectively, and first and second band portions extending from the first and second connection portions to a portion of the first surface, respectively, wherein the active region includes first and second internal electrodes alternately disposed to be exposed through the third and fourth surfaces of the capacitor body, respectively, with the dielectric layer interposed between the first and second internal electrodes; and first and second auxiliary electrodes disposed on a dielectric layer on which the first and second internal electrodes are disposed, the first and second auxiliary electrodes being spaced apart from the first and second internal electrodes, respectively, and exposed through the fourth and third surfaces of the capacitor body, respectively. The upper and lower cover regions each include at least one dummy electrode each disposed between a dielectric layer and a dielectric layer, and wherein a first margin portion between the first internal electrode and the first auxiliary electrode and a second margin portion between the second internal electrode and the second auxiliary electrode are located in a position deviating from ends of the first and second band portions in a first direction from the third surface to the fourth surface of the capacitor body.

A length of each of the first and second auxiliary electrodes may be greater than a length of each of the first and second band portions by 10% or more of the length of each of the first and second band portions in the first direction.

A length of each of the first and second margin portions in the first direction may range from 50 μm to 300 μm in the first direction.

The at least one dummy electrode may include a first dummy electrode and a second dummy electrode spaced apart from each other on the dielectric layer of the upper cover region, one ends of the first and second dummy electrodes being exposed through the third and fourth surfaces of the capacitor body, respectively; and a third dummy electrode and a fourth dummy electrode spaced apart from each other on the dielectric layer of the lower cover region, one ends of the third and fourth dummy electrodes being exposed through the third and fourth surfaces of the capacitor body, respectively. A third margin portion between the first dummy electrode and the second dummy electrode, and a fourth margin portion between the third dummy electrode and the fourth dummy electrode, may be located in a position deviating from the ends of the first and second band portions in the first direction from the third surface to the fourth surface of the capacitor body.

A length of each of the first to fourth dummy electrodes may be greater than a length of each of the first and second band portions by 10% or more of the length of each of the first and second band portions in the first direction.

A length of each of the third and fourth margin portions in the first direction may be 50 μm or more.

A length of each of the third and fourth margin portions in the first direction may range from 50 μm to 300 μm.

Lengths of the first and fourth dummy electrodes may be the same as lengths of the first and second internal electrodes, respectively, and lengths of the second and third dummy electrodes may be the same as lengths of the first and second auxiliary electrodes, respectively.

A length of the first dummy electrode may be smaller than a length of the first internal electrode, a length of the second dummy electrode may be greater than a length of the first auxiliary electrode, a length of the third dummy electrode may be greater than a length of the second auxiliary electrode, and a length of the fourth dummy electrode may be smaller than a length of the second internal electrode.

The first, second, third and fourth dummy electrodes may have the same length.

The upper cover region may further include an upper margin portion on an upper surface of an uppermost dummy electrode, and the lower cover region may further include a lower margin portion on a lower surface of a lowermost dummy electrode.

The first and second external electrodes include first and second conductive layers electrically connected to the first and second internal electrodes or the at least one dummy electrode, and at least one plating layer disposed on each of the first and second conductive layers.

The at least one plating layer includes first and second nickel plating layers disposed on the first and second conductive layers, and first and second tin plating layers disposed on the first and second nickel plating layers.

The capacitor body further includes a fifth surface and a sixth surface opposing each other in a third direction, and the first and second band portions further extend from the first and second connection portions to portions of the second, fifth, and sixth surfaces of the capacitor body.

Other features and aspects of the present disclosure will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
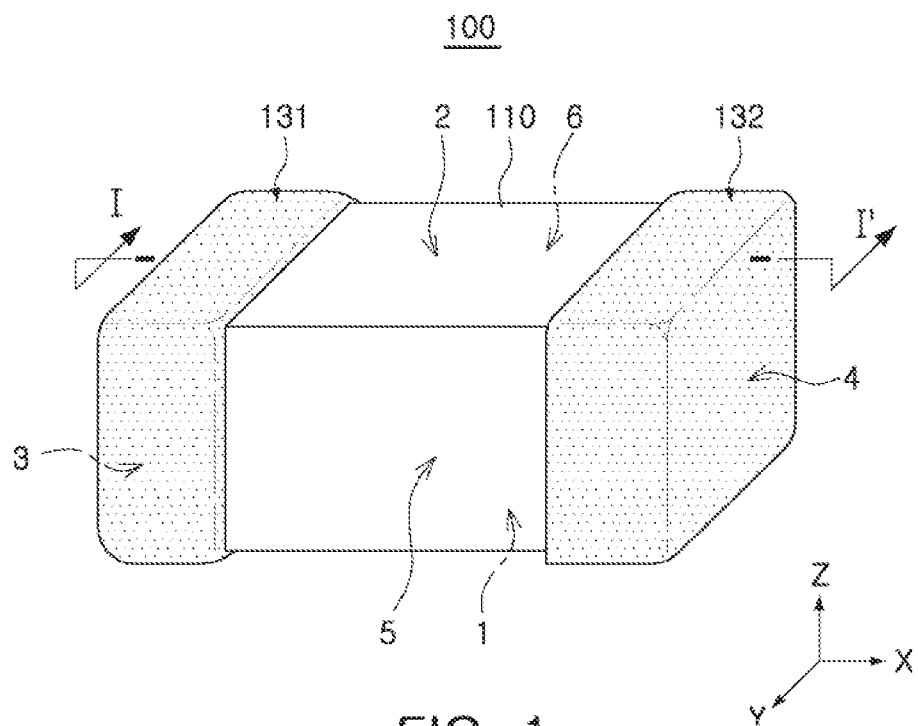
FIG. 1 is a perspective view illustrating an example of a multilayer capacitor.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

The terminology used herein is for describing various examples only, and is not to be used to limit the disclosure. As used herein, the term "and/or" includes any one and any combination of any two or more of the associated listed items. The articles "a," "an," and "the" are intended to include the plural forms as well, unless the context clearly indicates otherwise.

The use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower," relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

Hereinafter, when the direction of a capacitor body 110 is defined to clearly explain embodiments of the present disclosure, X, Y and Z shown in the drawings represent the length direction, the width direction and the thickness direction of the capacitor body 110, respectively. Further, in examples described below, the Z direction may be used in the same concept as the lamination direction in which dielectric layers are laminated.

Figure 2:
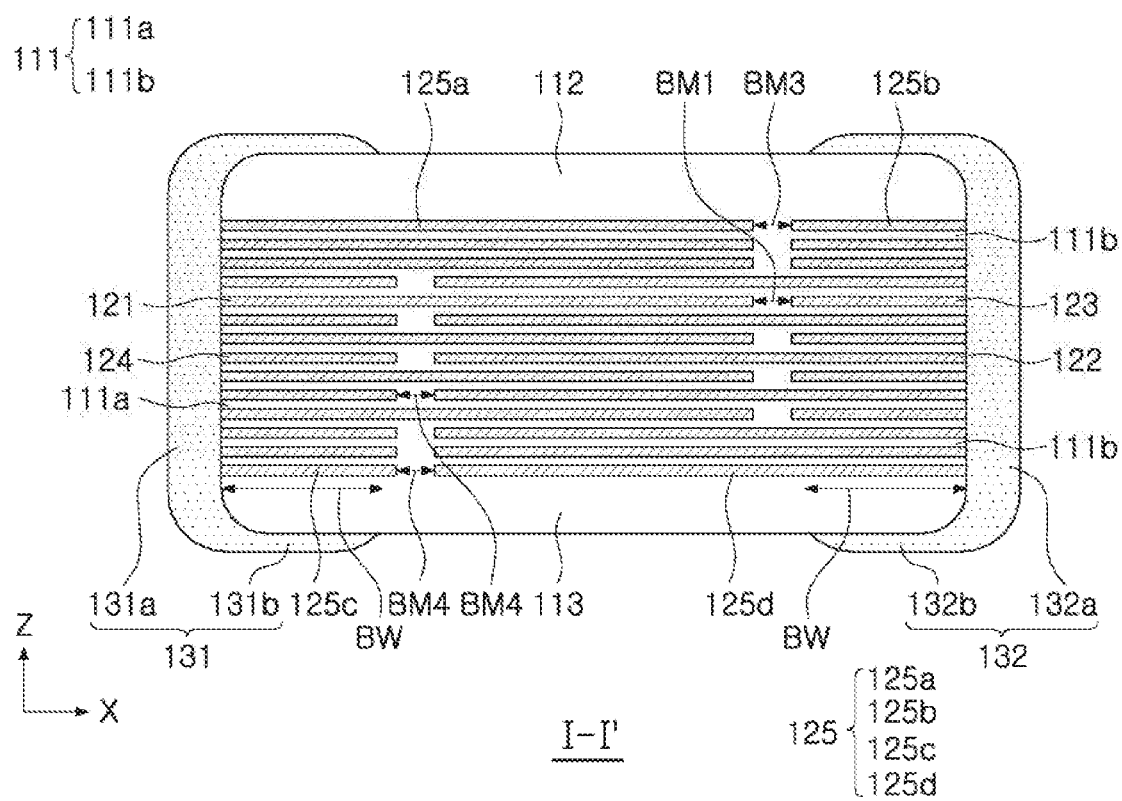
FIG. 2 is a cross-sectional view taken along line I-I' in FIG. 1.
Figure 3A:
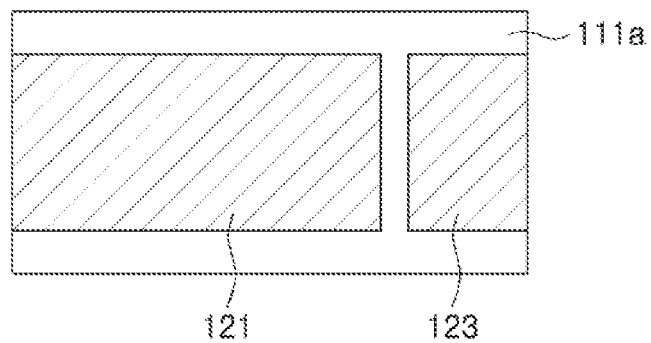
FIGS. 3A to 3D are plan views illustrating first and second internal electrodes, first and second auxiliary electrodes, and dummy electrodes included in a capacitor body of FIG. 1.
Figure 3B:
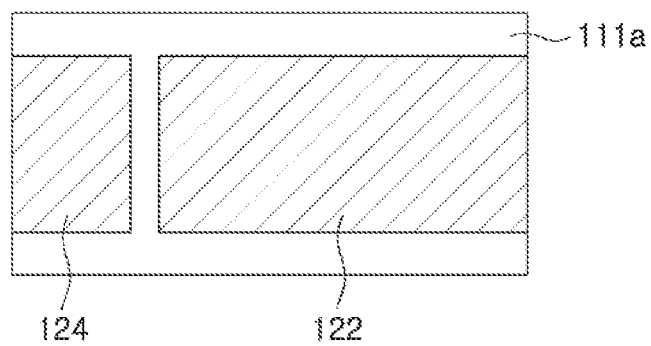
Figure 3C:
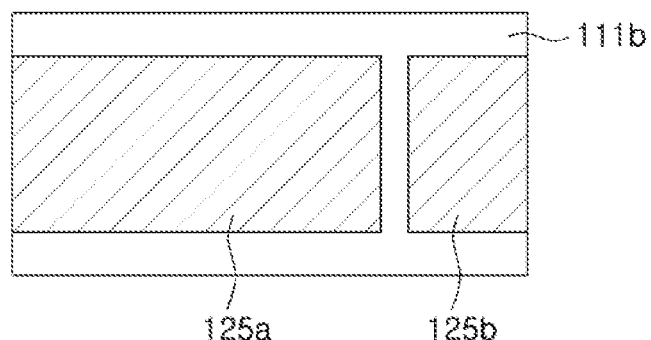
Figure 3D:
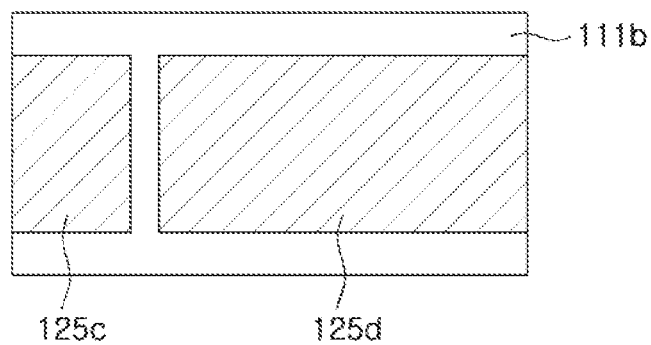

FIG. 1 is a perspective view illustrating an example of a multilayer capacitor. FIG. 2 is a cross-sectional view taken along line I-I' in FIG. 1. FIGS. 3A to 3D are plan views illustrating first and second internal electrodes, first and second auxiliary electrodes, and dummy electrodes included in a capacitor body of FIG. 1.

Referring to FIGS. 1 to 3, a multilayer capacitor 100 according to an example includes a capacitor body 110, first and second external electrodes 131 and 132 disposed on both ends of the capacitor body 110 in an X direction, first and second auxiliary electrodes 123 and 124, and a dummy electrode 125.

The capacitor body 110 is formed by laminating a plurality of dielectric layers 111 in a Z direction and then sintering the plurality of dielectric layers 111. In this case, the plurality of dielectric layers 111 forming the capacitor body 110 are in a sintered state, and may be integrated such that it may be difficult to confirm a boundary between adjacent dielectric layers 111 without using a scanning electron microscope (SEM).

In this case, the capacitor body 110 may have a substantially hexahedral shape, but an example thereof is not limited thereto. The shape and dimensions of the capacitor body 110 and the number of laminated layers of the dielectric layers 111 are not limited to those shown in the drawings of this example.

In this example, for convenience of explanation, two surfaces of the capacitor body 110 opposing each other in the Z direction are referred to as first and second surfaces 1 and 2, two surfaces of the capacitor body 110 connected to the first and second surfaces 1 and 2 and opposing each other in an X direction are referred to as third and fourth surfaces 3 and 4, and two surfaces thereof connected to the first and second surfaces 1 and 2 and opposing each other in a Y direction are referred to as fifth and sixth surfaces 5 and 6. In this example, the first surface 1 may be a surface in a mounting direction.

The dielectric layer 111 may include a ceramic material having a high dielectric constant, for example, a barium titanate ($BaTiO_3$)-based or strontium titanate ($SrTiO_3$)-based ceramic powder, or the like, but the ceramic material is not limited thereto. For example, any ceramic material may be used as long as sufficient capacitance may be obtained therefrom.

A ceramic additive, an organic solvent, a plasticizer, a binder, a dispersant and the like may further be added to the dielectric layer 111, together with the ceramic powder.

The ceramic additive may be, for example, a transition metal oxide or a transition metal carbide, a rare earth element, magnesium (Mg), aluminum (Al), or the like.

The capacitor body 110 may be configured to include an active region serving as a portion contributing to capacitance formation of a capacitor, and upper and lower cover regions 112 and 113 formed on upper and lower portions of the active region in the Z direction, respectively.

The active region includes a plurality of first and second internal electrodes 121 and 122 disposed alternately with a dielectric layer 111a interposed therebetween, and the first and second auxiliary electrodes 123 and 124.

One ends of the first and second internal electrodes 121 and 122 are exposed through the third and fourth surfaces 3 and 4 of the capacitor body 110, respectively. One ends of the first and second auxiliary electrodes 123 and 124 may be exposed through the fourth and third surfaces 4 and 3 of the capacitor body 110, respectively.

The first and second internal electrodes 121 and 122 are electrodes having different polarities, and are formed by printing a conductive paste including a conductive metal to a predetermined thickness on the dielectric layer 111a. The first and second internal electrodes 121 and 122 may be electrically insulated from each other by the dielectric layer 111a interposed therebetween.

The conductive metal may be one of, for example, silver (Ag), palladium (Pd), platinum (Pt), nickel (Ni) and copper (Cu), or alloys thereof, but is not limited thereto.

The conductive paste may be printed by a screen printing method, a gravure printing method or the like, but an example thereof is not limited thereto.

The first and second internal electrodes 121 and 122 are electrically connected to the first and second external electrodes 131 and 132 through portions of the first and second internal electrodes alternately exposed through the third and fourth surfaces 3 and 4 of the capacitor body 110, respectively.

Thus, when a voltage is applied to the first and second external electrodes 131 and 132, charges are accumulated between the first and second internal electrodes 121 and 122.

In this case, capacitance of the multilayer capacitor 100 is proportional to an overlapping area of the first and second internal electrodes 121 and 122 overlapping each other in the Z direction in the active region.

Lengths of the first and second internal electrodes 121 and 122 may be longer than lengths of the first and second auxiliary electrodes 123 and 124, respectively.

The first auxiliary electrode 123 is disposed on the dielectric layer 111a on which the first internal electrode 121 is disposed, to be spaced apart from the first internal electrode 121, and one end of the first auxiliary electrode 123 is connected to the fourth surface 4 of the capacitor body 110.

The second auxiliary electrode 124 is disposed on the dielectric layer 111a on which the second internal electrode 122 is disposed, to be spaced apart from the second internal electrode 122. One end of the second auxiliary electrode 124 is exposed to the third surface 3 of the capacitor body 110.

The first and second auxiliary electrodes 123 and 124 may improve bending strength and improve an electrical connection with the first and second external electrodes 131 and 132.

The upper and lower cover regions 112 and 113 may be formed by laminating two or more dielectric layers 111b in the Z direction on respective upper and lower surfaces of the active region, and the dummy electrode 125 disposed between the dielectric layers 111b.

In the case of the dummy electrode 125, two dummy electrodes are disposed on one dielectric layer 111b to be spaced apart from each other, and one ends of the two dummy electrodes may be exposed through the third and fourth surfaces 3 and 4 of the capacitor body 110, respectively.

The dummy electrode 125 may serve to improve bending strength.

In this example, the dummy electrode 125 may include first, second, third, and fourth dummy electrodes 125a, 125b, 125c and 125d.

In the upper cover region 112, a plurality of first dummy electrodes 125a and second dummy electrodes 125b may be disposed in the Z direction with the second dielectric layer 111b interposed therebetween. In the lower cover region 113, a plurality of third dummy electrodes 125c and fourth dummy electrodes 125d may be disposed in the Z direction with the second dielectric layer 111b interposed therebetween.

In more detail, the first dummy electrode 125a is disposed on the dielectric layer 111b of the upper cover region 112, and one end thereof is exposed through the third surface 3 of the capacitor body 110.

In this case, a length of the first dummy electrode 125a may be the same as a length of the first internal electrode 121.

The second dummy electrode 125b is disposed on the dielectric layer 111b of the upper cover region 112 to be spaced apart from the first dummy electrode 125a, and has one end exposed through the fourth surface 4 of the capacitor body 110.

In this case, a length of the second dummy electrode 125b may be the same as the length of the first auxiliary electrode 123.

The third dummy electrode 125c is disposed on the dielectric layer 111b of the lower cover region 113, and one end thereof is exposed through the third surface 3 of the capacitor body 110.

In this case, the length of the third dummy electrode 125c may be the same as the length of the second auxiliary electrode 124.

The fourth dummy electrode 125d is disposed on the dielectric layer 111b of the lower cover region 113 to be spaced apart from the third dummy electrode 125c, and has one end exposed through the fourth surface 4 of the capacitor body 110.

In this case, the length of the fourth dummy electrode 125d may be the same as the length of the second internal electrode 122.

Strength of the capacitor body 110 may be basically improved by the first to fourth dummy electrodes 125a, 125b, 125c and 125d.

The upper cover region 112 further includes an upper margin portion without an electrode on an upper surface of an uppermost dummy electrode in the Z direction, and the lower cover region 113 further includes a lower margin portion without an electrode on a lower surface of a lowermost dummy electrode in the Z direction.

The upper and lower margin portions may basically serve to prevent the first and second internal electrodes 121 and 122 from being damaged due to physical or chemical stress.

Voltages of different polarities are provided to the first and second external electrodes 131 and 132. The first and second external electrodes 131 and 132 are in contact with exposed portions of the first and second internal electrodes 121 and 122 to be electrically connected thereto, respectively.

In this case, the first external electrode 131 is connected to respective exposed portions of the second auxiliary electrode 124, the first dummy electrode 125a, and the third dummy electrode 125c, exposed through the third surface 3 of the capacitor body 110.

The second external electrode 132 is connected to respective exposed portions of the first auxiliary electrode 123, the second dummy electrode 125b and the fourth dummy electrode 125d, exposed through the fourth surface 4 of the capacitor body 110.

A plating layer may be disposed on surfaces of the first and second external electrodes 131 and 132 as needed.

For example, the first and second external electrodes 131 and 132 may include first and second conductive layers connected to internal electrodes or dummy electrodes, first and second nickel (Ni) plating layers disposed on the first and second conductive layers, and first and second tin (Sn) plating layers disposed on the first and second Ni plating layers, respectively.

The first external electrode 131 may include a first connection portion 131a and a first band portion 131b.

The first connection portion 131a is disposed on the third surface 3 of the capacitor body 110 to be connected to the first internal electrode 121, the second auxiliary electrode 124, the first dummy electrode 125a, and the third dummy electrode 125c. The first band portion 131b is provided as a portion of the first external electrode extending from the first connection portion 131a to a portion of the first surface 1, a mounting surface of the capacitor body 110.

In this case, the first band portion 131b may further extend to portions of the second, fifth, and sixth surfaces 2, 5 and 6 of the capacitor body 110 to improve fixing strength.

The second external electrode 132 may include a second connection portion 132a and a second band portion 132b.

The second connection portion 132a is disposed on the fourth surface 4 of the capacitor body 110 to be connected to the second internal electrode 122, the first auxiliary electrode 123, the second dummy electrode 125b, and the fourth dummy electrode 125d. The second band portion 132b is provided as a portion of the second external electrode extending from the second connection portion 132a to a portion of the first surface 1, a mounting surface of the capacitor body 110.

In this case, the second band portion 132b may further extend to portions of the second, fifth and sixth surfaces 2, 5 and 6 of the capacitor body 110 to improve fixing strength and the like.

A first margin portion between the first internal electrode 121 and the first auxiliary electrode 123 is located to deviate from positions of ends of the first and second band portions 131b and 132b in the X direction from the third surface 3 to the fourth surface 4 of the capacitor body 110.

A second margin portion between the second internal electrode 122 and the second auxiliary electrode 124 is located to deviate from positions of the ends of the first and second band portions 131b and 132b in the X direction from the third surface 3 to the fourth surface 4 of the capacitor body 110.

Lengths BM1 and BM2 of the first and second margin portions may each be 50 to 300 µm in the X direction from the third surface 3 to the fourth surface 4 of the capacitor body 110.

In this case, if the lengths of the first and second margin portions, for example, the length BM1 of a blank margin 1 and the length BM2 of a blank margin 2, are each less than 50 µm, a short circuit may occur at a high voltage, and if the lengths BM1 and BM2 of the first and second margin portions are each more than 300 µm, an overlapping area of the first and second internal electrodes 121 and 122 in the active region is reduced, such that capacitance may not be appropriately implemented.

In the X direction from the third surface 3 to the fourth surface 4 of the capacitor body 110, each of lengths of the first and second auxiliary electrodes 123 and 124 may be formed to be greater than a length BW of each of the first and second band portions 131b and 132b by 10% or more.

If each of the lengths of the first and second auxiliary electrodes 123 and 124 is longer than the length BW of each of the first and second band portions 131b and 132b by less than 10%, the first and second margin portions may not be overlapped with positions of the first and second band portions 131b and 132b, but the multilayer capacitor 110 may be structurally vulnerable to bending stress.

In this example, a third margin portion between the first dummy electrode 125a and the second dummy electrode 125b is located to deviate from positions of the ends of the first and second band portions 131b and 132b in the X direction from the third surface 3 to the fourth surface 4 of the capacitor body 110.

A fourth margin portion between the third dummy electrode 125c and the fourth dummy electrode 125d is located to deviate from positions of the ends of the first and second band portions 131b and 132b in the X direction from the third surface 3 to the fourth surface 4 of the capacitor body 110.

Lengths BM3 and BM4 of the third and fourth margin portions may be 50 to 300 μm in the X direction from the third surface 3 to the fourth surface 4 of the capacitor body 110.

In this case, if the lengths BM3 and BM4 of the third and fourth margin portions are each less than 50 μm, a short circuit may occur at a high voltage.

In the X direction from the third surface 3 to the fourth surface 4 of the capacitor body 110, each of lengths of the first to fourth dummy electrodes 125a, 125b, 125c and 125d may be formed to be longer than the length BW of each of the first and second band portions 131b and 132b by 10% or more.

If the lengths of the first to fourth dummy electrodes 125a, 125b, 125c and 125d are each longer than the length BW of each of the first and second band portions 131b and 132b by less than 10%, the third and fourth margin portions may not be overlapped with positions of the first and second band portions 131b and 132b, but the multilayer capacitor 110 may be structurally vulnerable to bending stress.

To implement bending strength characteristics of the multilayer capacitor 110 at a certain level or more in a design aspect, a dielectric layer on which an internal electrode of an appropriate number or more of layers is printed is required.

As the number of dielectric layers on which the internal electrodes are printed is increased, bending strength of the multilayer capacitor may generally be further improved.

In the case of a multilayer capacitor according to the related art, the number of dielectric layers into which electrodes are inserted are thus reinforced by additionally inserting an auxiliary electrode and a dummy electrode, not related to capacity implementation.

However, for example, when bending stress is applied to a multilayer capacitor, a bending crack may mainly start at a point at which an end of a band portion meets a capacitor body, and this crack may propagate to the outside of the capacitor body, for example, toward a center of an external electrode.

In the case of a multilayer capacitor according to the related art, a margin position on a dielectric layer in an X direction is located on a portion interlocked with an end of a band portion of an external electrode or overlapped with the band portion of the external electrode, resulting in a structure weak against bending stress.

In addition, at a point at which an end of the band portion meets a capacitor body, the higher the ceramic fraction is, the cracks may more easily occur while propagation may also be easier.

Thus, in this example of the present disclosure, as the margin between an internal electrode and an auxiliary electrode in the X direction in the dielectric layer 111a of the active region, and the margin between dummy electrodes disposed on a single dielectric layer 111b of the upper and lower cover regions, are located between the first and second band portions 131b and 132b of the first and second external electrodes 131 and 132, to be prevented from being engaged with the ends of the first and second band portions 131b and 132b in the X direction, thereby preventing a structure vulnerable to bending stress of the multilayer capacitor.

For example, as a void margin portion in which no internal electrode is present is positioned between the first band portion 131b of the first external electrode 131 and the second band portion 132b of the second external electrode 132, the occurrence of bending cracks may be reduced.

Experimental Example

In Table 1, when lengths of first and second auxiliary electrodes and lengths of second and third dummy electrodes are defined as IP, and lengths of first and second band portions are defined as BW in FIG. 2, the frequency of the occurrence of bending cracks is tested and test results are shown.

In this case, the multilayer capacitor was manufactured in such a manner that a capacitor body of the multilayer capacitor for each sample had a structure of internal electrodes and dummy electrodes as shown in FIG. 2, and the multilayer capacitor had a length of 32 mm and a width of 16 mm with electrical characteristics of 10 Nf and 50V.

The frequency of the occurrence of bending cracks was measured by locating the multilayer capacitor mounted on a substrate in a device capable of applying pressure to a mounting surface of the multilayer capacitor and by applying pressure downwardly on a surface of the multilayer capacitor opposite to the mounting surface to cause deflections of 5 mm and 6 mm, as shown in Table 1, until a current value is increased to determine whether or not bending cracking occurs.

In Table 1 below, A, B, C, D and E are distinguished to confirm distribution between lots.

TABLE 1

| | IP/BW | | | | | | | | | |
|---|---|---|---|---|---|---|---|---|---|---|
| | Frequency of Occurrence of Bending Cracks IP/BW | | | | | | | | | |
| | 5 mm | | | | | 6 mm | | | | |
| LOT | A | B | C | D | E | A | B | C | D | E |
| 0.7 | 2/60 | 1/60 | 2/60 | 0/60 | 1/60 | 2/60 | 2/60 | 1/60 | 2/60 | 4/60 |
| 0.9 | 2/60 | 0/60 | 1/60 | 1/60 | 1/60 | 3/60 | 1/60 | 1/60 | 2/60 | 5/60 |
| 1.0 | 1/60 | 0/60 | 2/60 | 0/60 | 0/60 | 2/60 | 1/60 | 2/60 | 1/60 | 3/60 |
| 1.1 | 0/60 | 0/60 | 0/60 | 0/60 | 0/60 | 0/60 | 0/60 | 0/60 | 0/60 | 0/60 |
| 1.3 | 0/60 | 0/60 | 0/60 | 0/60 | 0/60 | 0/60 | 0/60 | 0/60 | 0/60 | 0/60 |
| 1.5 | 0/60 | 0/60 | 0/60 | 0/60 | 0/60 | 0/60 | 0/60 | 0/60 | 0/60 | 0/60 |
| 1.7 | 0/60 | 0/60 | 0/60 | 0/60 | 0/60 | 0/60 | 0/60 | 0/60 | 0/60 | 0/60 |
| 2.0 | 0/60 | 0/60 | 0/60 | 0/60 | 0/60 | 0/60 | 0/60 | 0/60 | 0/60 | 0/60 |

Referring to Table 1, it can be appreciated that bending strength of 5 mm and 6 mm may be guaranteed at IP/BW of 1.1 or more. Thus, a numerical value of IP/BW according to an example of the present disclosure is 1.1 or more.

Figure 4:
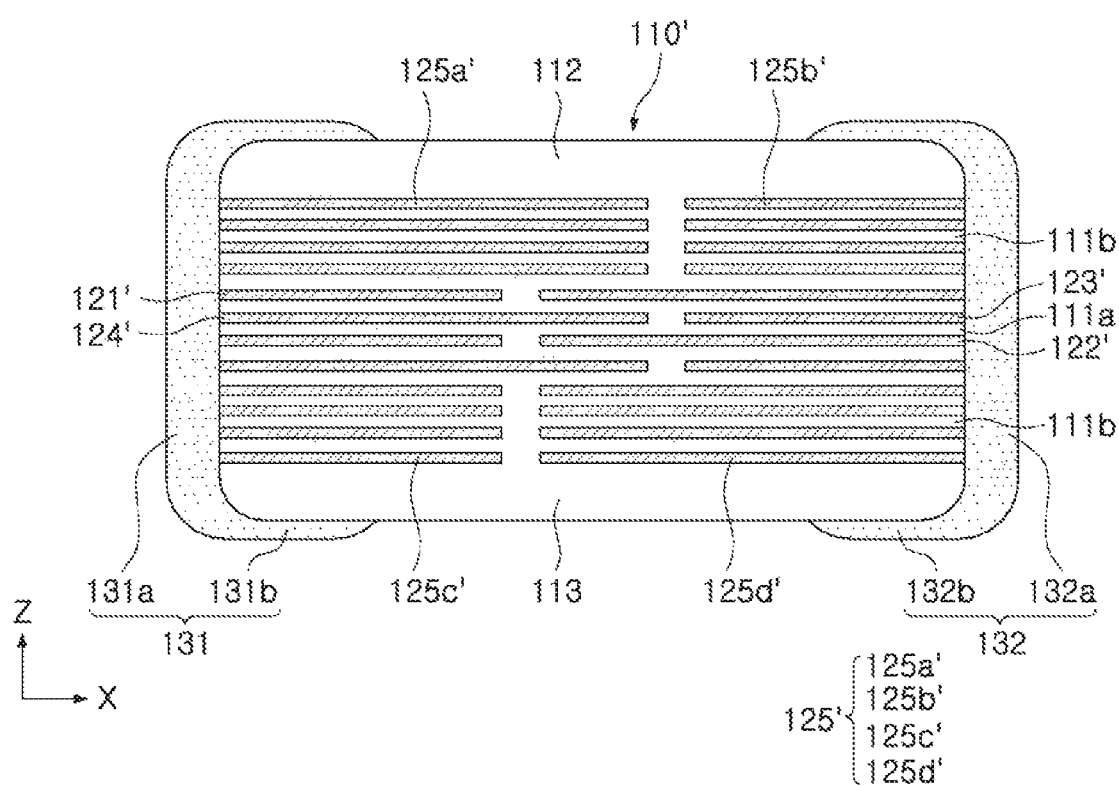
FIG. 4 is a cross-sectional view illustrating another example of a multilayer capacitor.

FIG. 4 is a cross-sectional view illustrating another example of a multilayer capacitor. FIGS. 5A to 5D are plan views illustrating first and second internal electrodes, first and second auxiliary electrodes, and dummy electrodes included in the capacitor body of FIG. 4. In this case, the structures of first and second external electrodes, a first dielectric layer, and a second dielectric layer are the same as those in the foregoing example, and thus a detailed description thereof will be omitted to avoid redundancy.

Figure 5A:
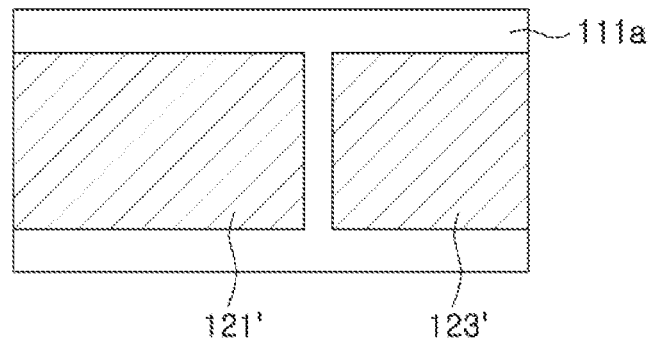
FIGS. 5A to 5D are plan views illustrating first and second internal electrodes, first and second auxiliary electrodes, and dummy electrodes included in a capacitor body of FIG. 4.
Figure 5B:
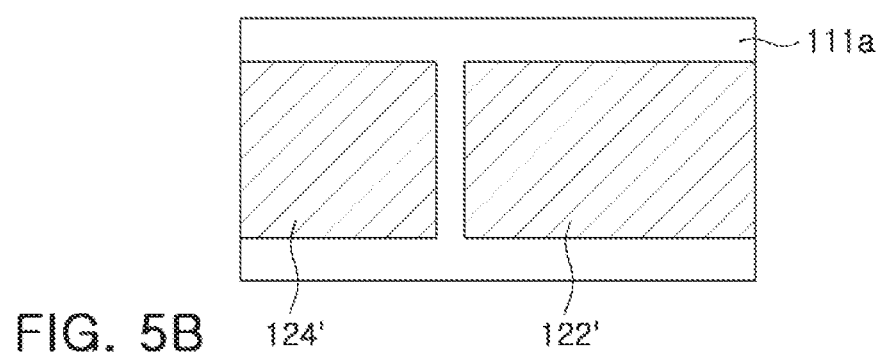
Figure 5C:
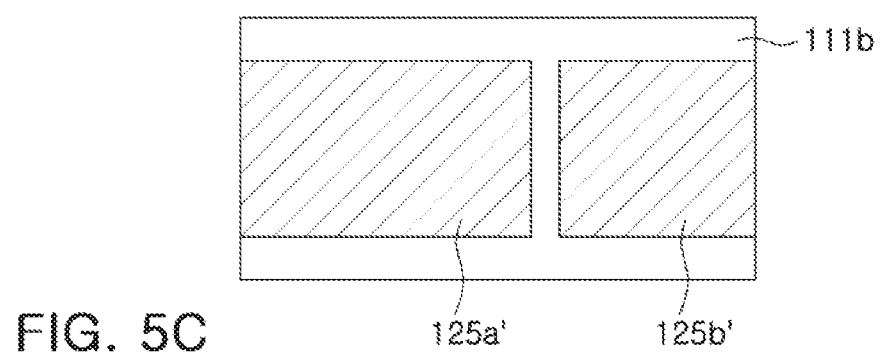
Figure 5D:
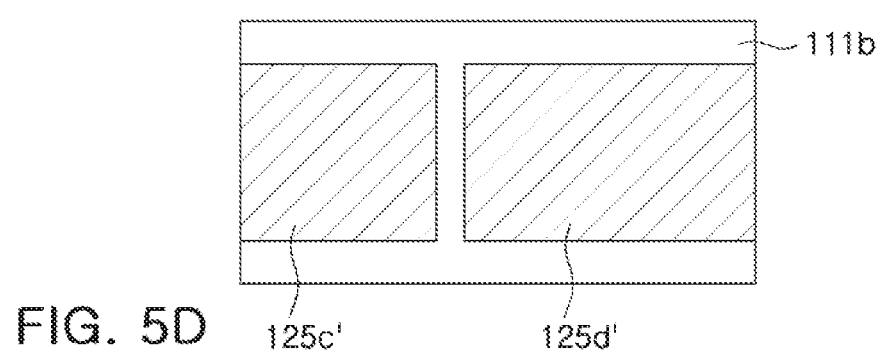

Referring to FIGS. 4 to 5D, compared with the multilayer capacitor of FIG. 2 described above, lengths of first and second internal electrodes 121' and 122' are reduced and lengths of first and second auxiliary electrodes 123' and 124' are increased by reduced lengths of the first and second internal electrodes 121' and 122'.

In addition, in the case of a dummy electrode 125', lengths of a first dummy electrode 125a' and a fourth dummy electrode 125d' are reduced, and lengths of second and third dummy electrodes 125b' and 125c' are increased by reduced lengths of the first and fourth dummy electrodes 125a' and 125d'.

Thus, first and second margin portions may be located closer to a center of a capacitor body 110' in an X direction than in the foregoing example.

Positions of third and fourth margin portions may also be closer to the center of the capacitor body 110' in the X direction than in the foregoing example.

Thus, bending strength of the capacitor body 110' may be further improved by further reinforcing a portion vulnerable to bending cracks, as compared with the multilayer capacitor of FIG. 2, and thus, the reliability may be further improved.

Figure 6:
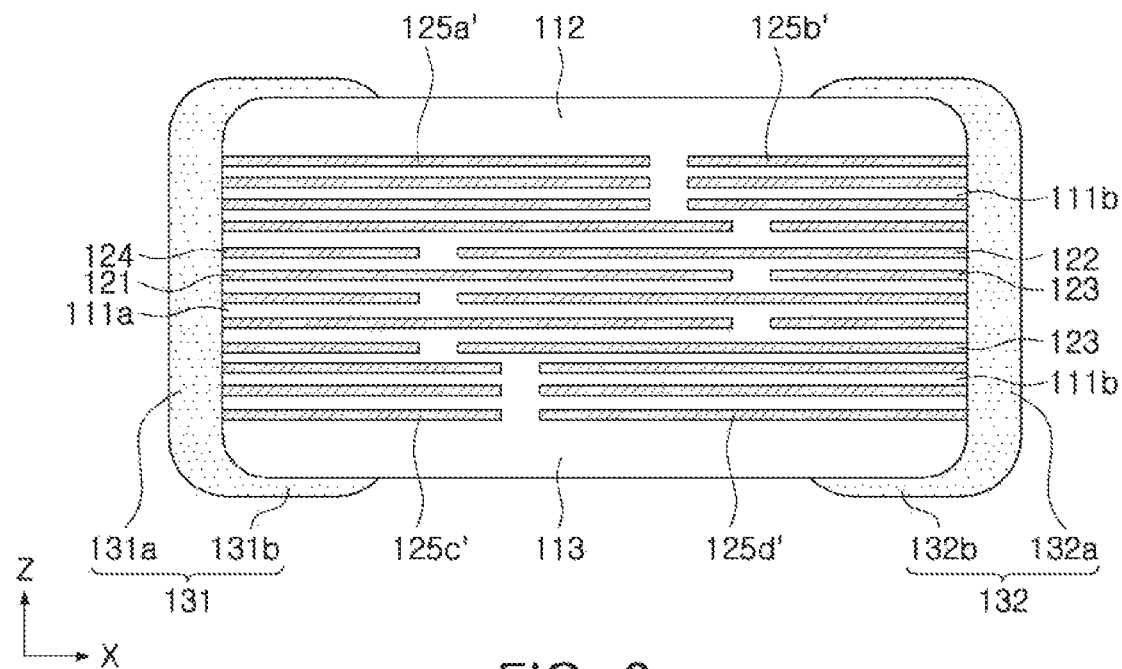
FIG. 6 is a cross-sectional view illustrating another example of a multilayer capacitor.

FIG. 6 is a cross-sectional view illustrating another example of a multilayer capacitor. In this case, the structures of first and second external electrodes, a first dielectric layer, and a second dielectric layer are the same as those in the foregoing example, and thus a detailed description thereof will be omitted to avoid redundancy.

Referring to FIG. 6, in the case of a dummy electrode 125', lengths of a first dummy electrode 125a' and a fourth dummy electrode 125d' are reduced, and lengths of second and third dummy electrodes 125b' and 125c' are increased by reduced lengths of the first and fourth dummy electrodes 125a' and 125d', as compared with the multilayer capacitor of FIG. 2 described above.

Thus, third and fourth margin portions may be located closer to a center of a capacitor body 110' in an X direction than in the foregoing example.

Thus, bending strength of the capacitor body 110' may be further improved by further reinforcing a portion vulnerable to bending cracks in a cover region, as compared with the multilayer capacitor of FIG. 2, and thus, the reliability may be further improved.

Figure 7:
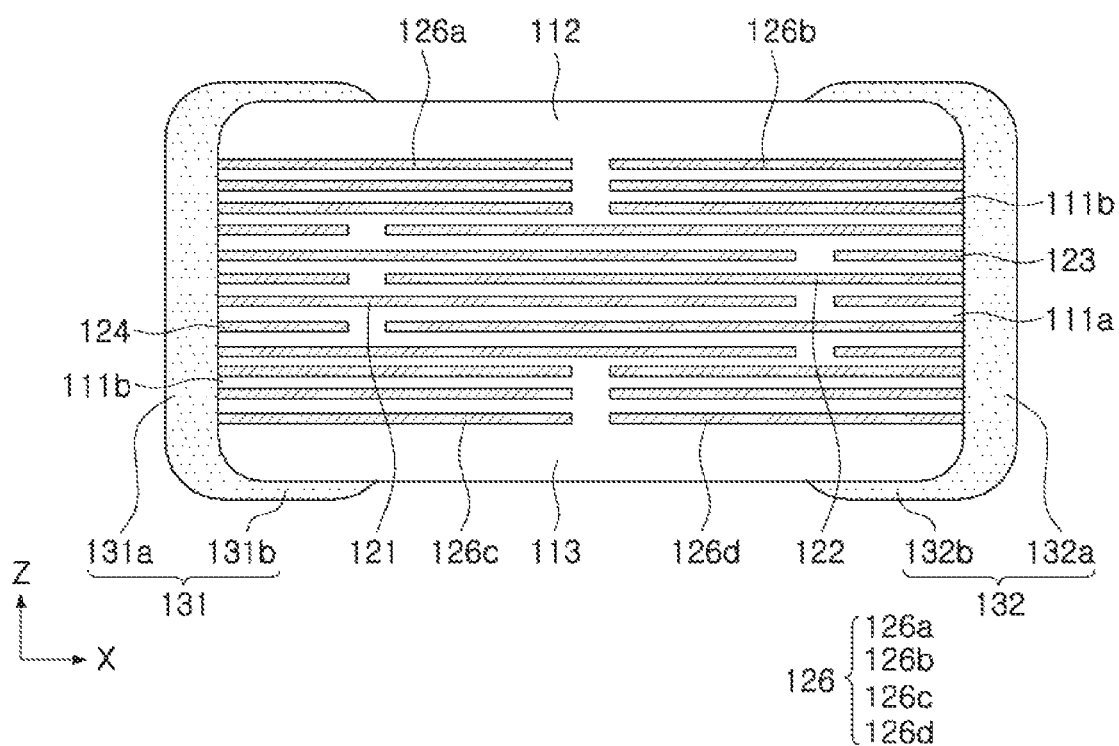
FIG. 7 is a cross-sectional view illustrating another example of a multilayer capacitor.
Figure 8:
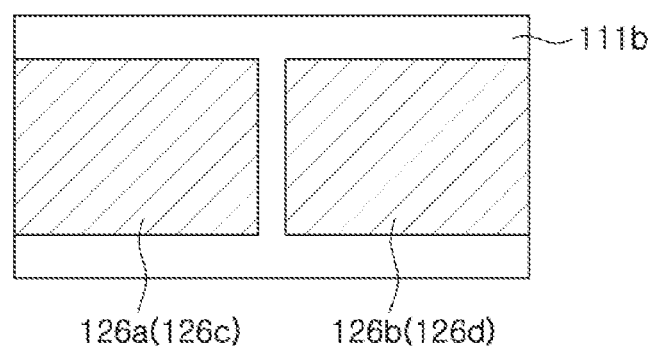
FIG. 8 is a plan view illustrating a dummy electrode included in a capacitor body of FIG. 7.

FIG. 7 is a cross-sectional view illustrating another example of a multilayer capacitor. FIG. 8 is a plan view illustrating a dummy electrode included in a capacitor body of FIG. 7. In this case, the structures of first and second external electrodes, a first dielectric layer, and a second dielectric layer are the same as those in the foregoing example, and thus a detailed description thereof will be omitted to avoid redundancy.

Referring to FIGS. 7 and 8, in the case of a dummy electrode 126, lengths of a first dummy electrode 126a and a fourth dummy electrode 126d are reduced, and lengths of second and third dummy electrodes 12b and 126c are increased by reduced lengths of the first and fourth dummy electrodes 126a and 126d, as compared with the multilayer capacitor of FIG. 2 described above.

In more detail, in this example, the lengths of the first to fourth dummy electrodes 126a, 126b, 126c and 126d may all be the same as one another.

Thus, third and fourth margin portions may be located closer to a center of a capacitor body 110' in an X direction than in the foregoing example.

Thus, bending strength of the capacitor body 110' may be further improved by further reinforcing a portion vulnerable to bending cracks in a cover region, as compared with the multilayer capacitor of FIG. 2, and thus, the reliability may be further improved.

Bending strength characteristics of the multilayer capacitor disclosed herein may be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising: a capacitor body having a first surface and a second surface opposing each other and a third surface and a fourth surface connected to the first and second surfaces and opposing each other in a first direction, the capacitor body including an active region, and upper and lower cover regions disposed on upper and lower portions of the active region, respectively; and first and second external electrodes including first and second connection portions disposed on the third and fourth surfaces of the capacitor body, respectively, and first and second hand portions extending from the first and second connection portions to a portion of the first surface, respectively, wherein the active region includes first and second internal electrodes alternately disposed to be exposed through the third and fourth surfaces of the capacitor body, respectively, with a dielectric layer interposed between the first and second internal electrodes; and first and second auxiliary electrodes disposed on the dielectric layer on which the first and second internal electrodes are disposed, the first and second auxiliary electrodes being spaced apart from the first and second internal electrodes, respectively, and exposed through the fourth and third surfaces of the capacitor body, respectively, the upper and lower cover regions each include at least one dummy, electrode each disposed between a dielectric layer and a dielectric layer, and a first margin portion between the first internal electrode and the first auxiliary electrode and a second margin portion between the second internal electrode and the second auxiliary electrode are located in a position deviating from the first and second band portions in the first direction; wherein the at least one dummy electrode comprises a first dummy electrode and a second dummy electrode spaced apart from each other on the dielectric layer of the upper cover region, one ends of the first and second dummy electrodes being exposed through the third and fourth surfaces of the capacitor body, respectively; and a third dummy electrode and a fourth dummy electrode spaced apart from each other on the dielectric layer of the lower cover region, one ends of the third and fourth dummy electrodes being exposed through the third and fourth surfaces of the capacitor body, respectively, and a third margin portion between the first dummy electrode and the fourth dummy electrode are located in a position deviating from the ends of the first and second band portions in the first direction from the third surface to the fourth surface of the capacitor body; wherein lengths of the first and fourth dummy electrodes are substantially the same as lengths of the first and second internal electrodes, respectively, and lengths of the second and third dummy electrodes are substantially the same as lengths of the first and second auxiliary electrodes, respectively.

2. The multilayer capacitor of claim 1, wherein a length of the first and second auxiliary electrodes is greater than a length of each of the first and second band portions by 10% or more of the length of each of the first or second band portions in the first direction.

3. The multilayer capacitor of claim 1, wherein a length of each of the first and second margin portions in the first direction ranges from 50 µm to 300 µm.

4. The multilayer capacitor of claim 1, wherein a length of each of the first to fourth dummy electrodes is greater than a length of each of the first and second band portions by 10% or more of the length of each of the first or second hand portions in the first direction.

5. The multilayer capacitor of claim 1, wherein a length of each of the third and fourth margin portions in the first direction is 50 pm or more.

6. The multilayer capacitor of claim 1, wherein a length of each of the third and fourth margin portions in the first direction ranges from 50 pm to 300 pm.

7. The multilayer capacitor of claim 1, wherein a length of the first dummy electrode is smaller than a length of the first internal electrode, a length of the second dummy electrode is greater than a length of the first auxiliary electrode, a length of the third dummy electrode is greater than a length of the second auxiliary electrode, and a length of the fourth dummy electrode is smaller than a length of the second internal electrode.

8. The multilayer capacitor of claim 1, wherein the first, second, third and fourth dummy electrodes have substantially the same length.

9. The multilayer capacitor of claim 1, wherein the upper cover region further includes an upper margin portion on an upper surface of an uppermost dummy electrode, and
the lower cover region further includes a lower margin portion on a lower surface of a lowermost dummy electrode.

10. The multilayer capacitor of claim 1, wherein the first and second external electrodes include first and second conductive layers electrically connected to the first and second internal electrodes or the at least one dummy electrode, and at least one plating layer disposed on each of the first and second conductive layers.

11. The multilayer capacitor of claim 10, wherein the at least one plating layer includes first and second nickel plating layers disposed on the first and second conductive layers, and first and second tin plating layers disposed on the first and second nickel plating layers.

12. The multilayer capacitor of claim 1, wherein the capacitor body further includes a fifth surface and a sixth surface opposing each other in a third direction, and
the first and second band portions further extend from the first and second connection portions to portions of the second, fifth, and sixth surfaces of the capacitor body.

13. A multilayer capacitor comprising: a capacitor body having a first surface and a second surface opposing each other and a third surface and a fourth surface connected to the first and second surfaces and opposing each other in a first direction, the capacitor body including an active region, and upper and lower cover regions disposed on upper and lower portions of the active region, respectively; and first and second external electrodes including first and second connection portions disposed on the third and fourth surfaces of the capacitor body, respectively, and first and second band portions extending from the first and second connection portions to a portion of the first surface, respectively, wherein the active region includes first and second internal electrodes alternately disposed to be exposed through the third and fourth surfaces of the capacitor body, respectively, with a dielectric layer interposed between the first and second internal electrodes; and first and second auxiliary electrodes disposed on the dielectric layer on which the first and second internal electrodes are disposed, the first and second auxiliary electrodes being spaced apart from the first and second internal electrodes, respectively, and exposed through the fourth and third surfaces of the capacitor body, respectively, the upper and lower cover regions each include at least one dummy electrode each disposed between a dielectric layer and a dielectric layer, and a first margin portion between the first internal electrode and the first auxiliary electrode and a second margin portion between the second internal electrode and the second auxiliary electrode are arranged between ends of the first and second hand portions in the first direction; wherein the at least one dummy electrode comprises a first dummy electrode and a second dummy electrode spaced apart from each other on the dielectric layer of the upper cover region, one ends of the first and second dummy electrodes being exposed through the third dummy electrode spaced apart from each other on the dielectric layer of the lower cover region, one ends of the third and fourth dummy electrodes being exposed through the third and fourth surfaces of the capacitor body, respectively, and a third margin portion between the first dummy electrode and the second dummy electrode, and a fourth margin portion between the third dummy electrode and the fourth dummy electrode are located in a position deviating from the ends of the first and second band portions in the first direction from the third surface to the fourth surface of the capacitor body; wherein lengths of the first and fourth dummy electrodes are Substantially the same as lengths of the first and second internal electrodes, respectively, and lengths of the second and third dummy electrodes are substantially the same as lengths of the first and second auxiliary electrodes, respectively.

* * * * *